United States Patent [19]
Kolluri et al.

[11] Patent Number: 5,905,368
[45] Date of Patent: May 18, 1999

[54] METHOD AND APPARATUS FOR ENABLING A STEP-UP OR STEP-DOWN OPERATION USING A SYNCHRONOUS RECTIFIER CIRCUIT

[75] Inventors: Madhav V. Kolluri, Sunnyvale; Gregory L. Schaffer, Cupertino, both of Calif.

[73] Assignee: Maxim Integrated Products, Sunnyvale, Calif.

[21] Appl. No.: 08/942,471

[22] Filed: Oct. 2, 1997

Related U.S. Application Data

[62] Division of application No. 08/307,265, Sep. 15, 1994, Pat. No. 5,721,483.

[51] Int. Cl.[6] .................................................. G05F 1/613
[52] U.S. Cl. .......................................................... 323/224
[58] Field of Search ..................................... 323/312, 313, 323/224, 226, 282

[56] References Cited

U.S. PATENT DOCUMENTS

| | | | |
|---|---|---|---|
| 4,618,812 | 10/1986 | Kawakami | 323/224 |
| 5,255,174 | 10/1993 | Murugan | 363/17 |
| 5,394,078 | 2/1995 | Brokaw | 323/313 |
| 5,446,414 | 8/1995 | Kolluri | 330/288 |
| 5,742,155 | 4/1998 | Susak et al. | 323/901 |

OTHER PUBLICATIONS

"Modern DC–To–DC Switchmode Power Converter Circuits", Rudolf P. Severns et al., Van Nostrand Reinhold Company (1985), pp. 51–77.

"Principles of Power Electronics", John G. Kassakain et al., Addison–Wesley Publishing Company (1991), pp. 103–135, 268–269.

"Get +5V/100 MA From Your Cells", Mitchell Lee, *Electronic Design*, Jan. 1992.

*Primary Examiner*—Matthew Nguyen
*Attorney, Agent, or Firm*—Blakely, Sokoloff, Taylor & Zafman LLP

[57] ABSTRACT

A circuit for controllably coupling an input to an output. The circuit includes: (1) a pass transistor having an emitter, a collector and a base, the emitter being coupled to the input, the collector being coupled to the output; (2) a second transistor coupled to the pass transistor, and biased to operate with a collector-to-base voltage approximately equal to zero; and (3) a control circuit coupled to the input, the output and the base of the pass transistor, the control circuit controllably turning the pass transistor on. When the pass transistor is turned on, the control circuit maintains in the pass transistor a collector current approximately equal to a predetermined scale factor times the collector current of the second transistor. The predetermined scale factor ensures that the pass transistor operates at the edge of a saturation region when the pass transistor is turned on.

19 Claims, 6 Drawing Sheets

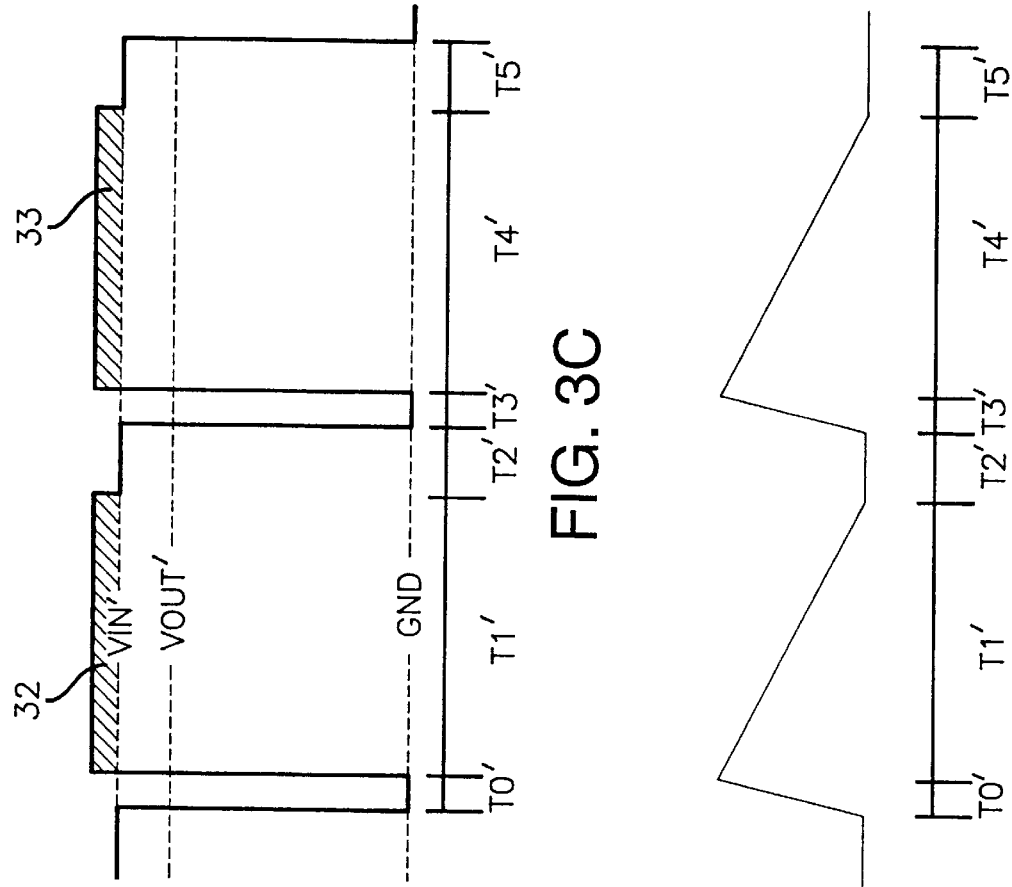
FIG. 3A
FIG. 3B
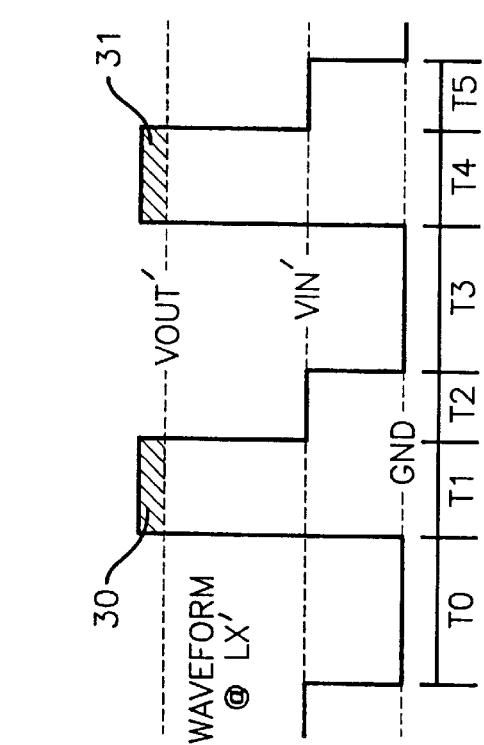
FIG. 3C
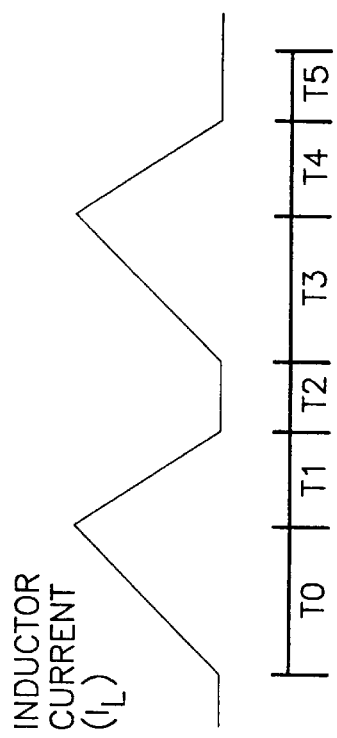
FIG. 3D

METHOD AND APPARATUS FOR ENABLING A STEP-UP OR STEP-DOWN OPERATION USING A SYNCHRONOUS RECTIFIER CIRCUIT

This is a Divisional Application of application Ser. No. 08/307,265, filed Sep. 15, 1994, now U.S. Pat No. 5,721,483.

BACKGROUND OF THE INVENTION

1. Field of the Invention

The present invention relates to the field of power supply circuits, DC-DC converters, low dropout regulators, synchronous rectifiers, line drivers, voltage regulators, pass elements and the like.

2. Background

A typical step-up DC-DC converter employing a flyback topology is shown in FIG. 1. In this circuit topology, an inductor L1 alternately stores and releases energy which is directed to the load in a controlled manner. During the charging cycle, the switch S1 is turned on. The voltage across inductor L1 induces a current which rises linearly until the voltage is removed by opening switch S1. When switch S1 is opened, the stored energy in inductor L1 attempts to maintain the current therethrough, causing the voltage across inductor L1 to change polarity. The voltage at the anode of a catch diode D1 (hereinafter referred to as the voltage at LX, or VLX) rises until diode D1 is forward biased, delivering power to the output. The open and closed positions of switch S1 are determined by a switch control circuit 12 which is designed to keep the output in regulation.

There are two main drawbacks with using a simple catch diode in battery powered systems.

First, because catch diode D1 presents a low impedance path to the output even when control circuit 12 holds the switch S1 off, a conventional DC-DC converter may drain the battery coupled to its input and consume power even during a shut-down mode. With the control circuit holding switch S1 off, the output voltage is at VIN–VF (VF=the forward-biased voltage drop of diode D1), and the output load, if not switched off, drains the battery. Typical solutions have been to either place a switch in series with the load or to have a power-down mode for the load.

Second, the battery voltage can vary over a wide range from a voltage level when the battery is fresh to another voltage level when the battery reaches its end-of-life or end-of-charge condition. Thus, it is possible for the output voltage to be within this range, making the design of the DC-DC converter difficult. For example, a four-cell (Alkaline) input to 5V output is a popular application. The operating input voltage can range from 6.2V when the battery is fresh to 3.6V at the end of the battery life.

In these applications, the use of a typical boost converter with a catch diode presents a problem since when an input voltage to the catch diode is greater than 5V+VF, the output voltage will be VIN–VF, and thus, the output voltage is out of regulation. A paper titled "Get +5V/100 mA From Four Cells," Electronic Design, Jan. 9, 1992, p. 132 describes an approach to boost the input voltage to above the maximum expected input voltage and to use a linear regulator to regulate the voltage down to a desired voltage. Such a conventional approach is not only complicated but also low in efficiency.

The present invention includes a synchronous rectifier which overcomes these drawbacks of a catch diode, especially in battery powered systems.

The present invention provides a step-up and step-down DC-DC converter having an on-chip synchronous rectifier. This synchronous rectifier replaces the Schottky diode of a conventional step-up DC-DC converter, thus reducing the number of external components and providing a lower forward voltage drop across the synchronous rectifier than that across a Schottky diode. In the present invention, the on-chip synchronous rectifier appears as a high impedance element in series with an inductor and a load when the device is placed in a shut-down mode. This high impedance prevents the current drain associated with conventional step-up converters in the shut-down mode.

The step-up or step-down DC-DC converter of the present invention can maintain regulation of the output voltage even when the input voltage is significantly above or below the target output voltage. For example, the present invention can generate and regulate a 5V output from 4 Alkaline batteries when the input voltage to the DC-DC converter varies from 6.2V, or 1.55V/cell with fresh batteries, to 3.6V or 0.9V/cell at the end of the battery life.

SUMMARY OF THE INVENTION

The present invention provides an on-chip synchronous rectifier for enabling a step-up or step-down operation of a DC-DC converter. The synchronous rectifier consists of a series pass element.

More specifically, the present invention provides a method and apparatus of controlling a series pass element in the form of a PNP transistor coupled between a first terminal and an output terminal of a circuit. The circuit includes an input terminal, an inductor for storing energy, a switch, a switch control circuit and a rectifier control circuit for controlling the series pass element. After closing the switch to build up energy in the inductor, the series pass element turns on simultaneously with the opening of the switch when the voltage of the first terminal is greater than the voltage of the output terminal and the voltage of the input terminal. The series pass element turns off when a current through the inductor becomes zero or when the switch closes again.

The series pass element is off when the circuit is in a shut-down mode to conserve power, or when the voltage of the first terminal does not exceed either the voltage of the input or output terminals. The PNP series pass element may be used not only in a DC-DC converter but also in line drivers, voltage regulators or the like.

BRIEF DESCRIPTION OF THE DRAWINGS

FIG. 3A shows the voltage waveform at node LX' (VLX') of FIG. 2 when the input voltage is less than the output voltage.

FIG. 3B shows the current waveform of the inductor current $I_L$ in FIG. 2 when the input voltage of FIG. 2 is less than the output voltage.

FIG. 3C shows the voltage waveform at node LX' when the input voltage of FIG. 2 is greater than the output voltage.

FIG. 3D shows the current waveform of the inductor current $I_L$ in FIG. 2 when the input voltage of FIG. 2 is greater than the output voltage.

DETAILED DESCRIPTION OF THE INVENTION

Figure 1:
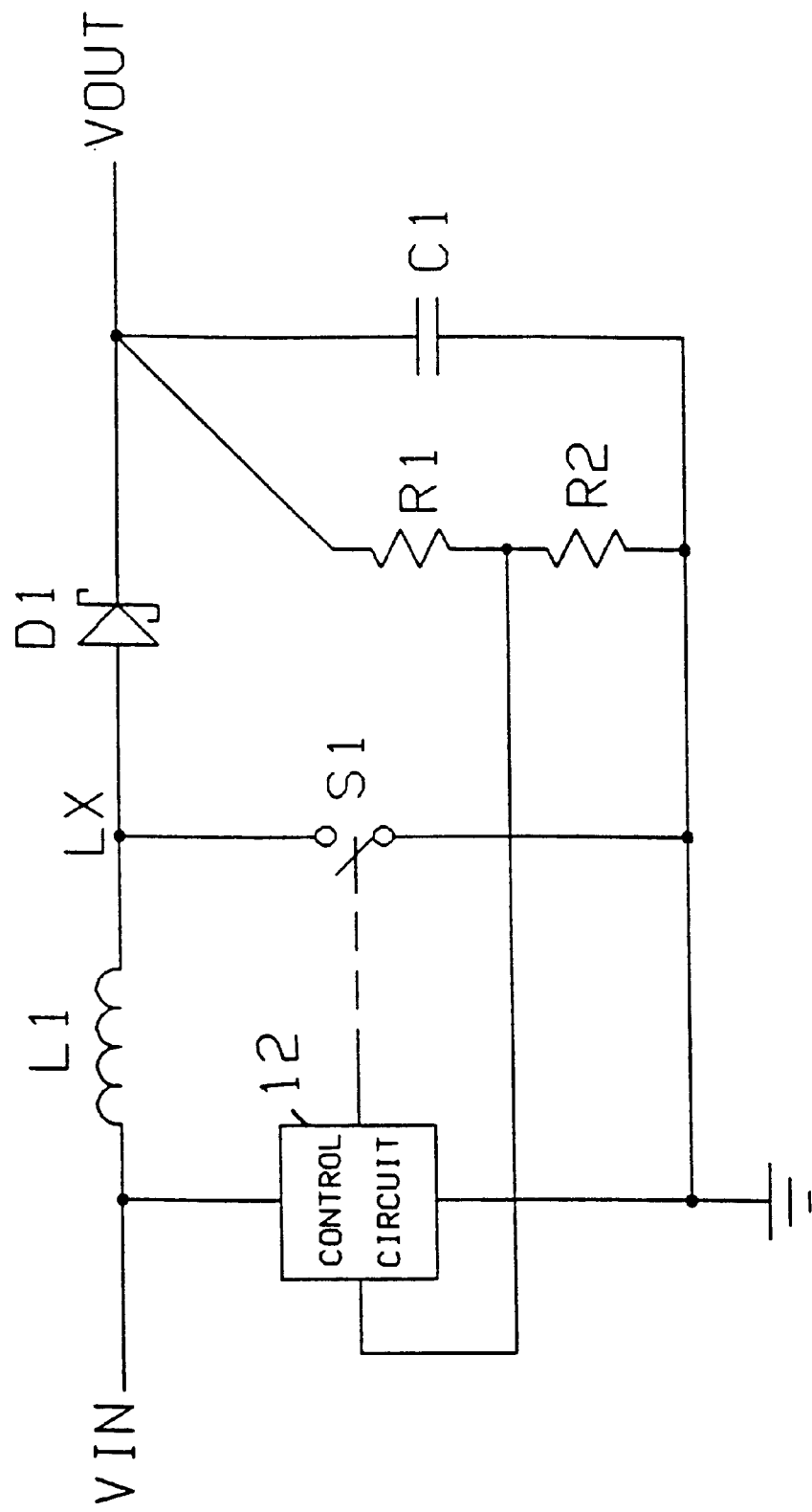
FIG. 1 is a diagram of a prior art step-up DC-DC converter employing a flyback topology.
Figure 2:
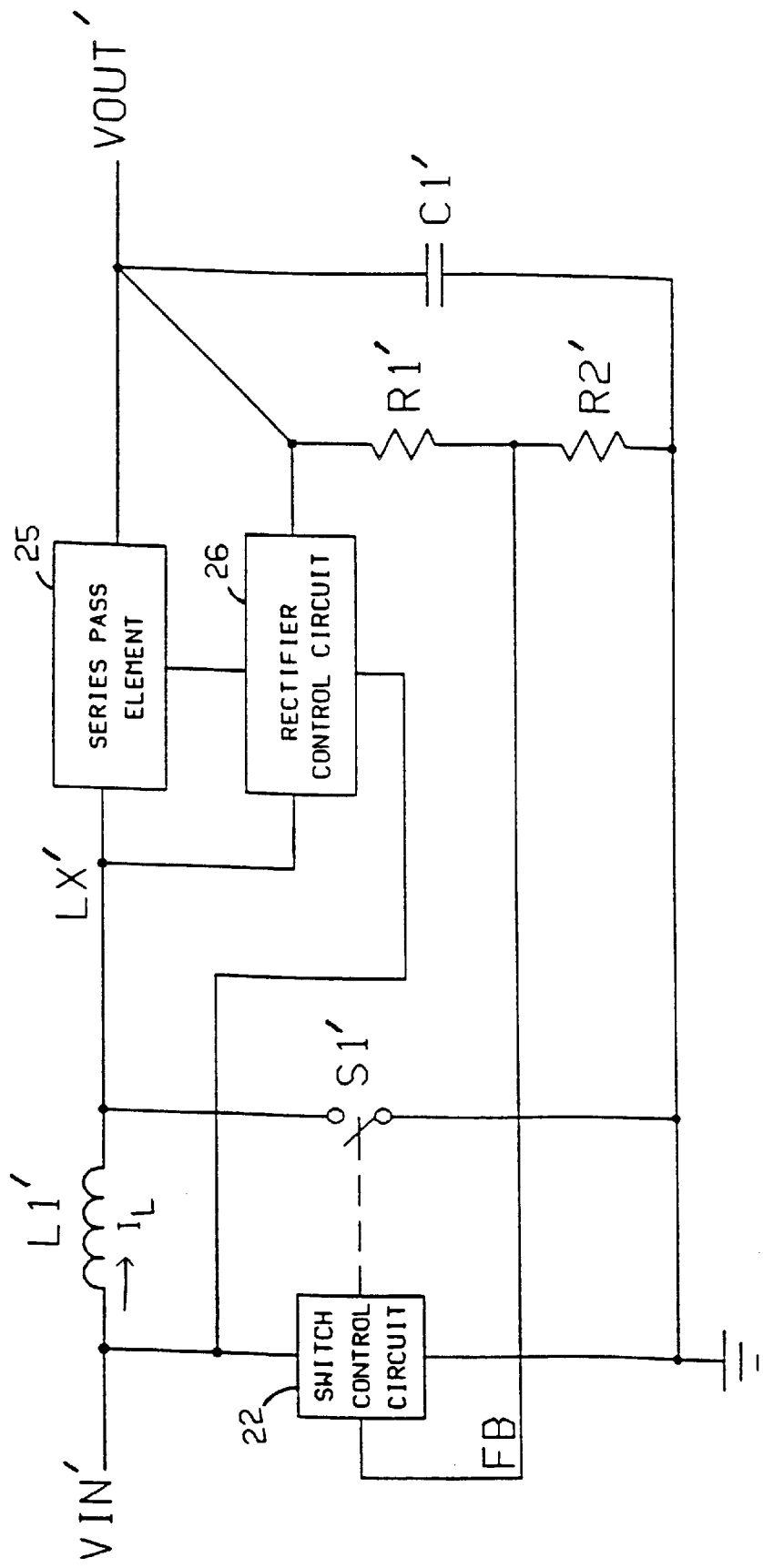
FIG. 2 is a diagram of a step-up/step-down DC-DC converter according to the present invention.

Now referring to FIG. 2, a DC-DC converter of the present invention includes an inductor L1', a switch S1', a switch control circuit 22 for controlling switch S1', a series pass element 25 acting as a synchronous rectifier, and a rectifier control circuit 26 for controlling the pass element. In the preferred embodiment, the series pass element 25 is a PNP transistor. The rectifier control circuit 26 determines whether series pass element 25 is on or off by the voltage at LX', sometimes hereafter VLX', relative to the input voltage (VIN') and the output voltage (VOUT'). The rectifier control circuit 26 turns off series pass element 25 when the voltage at LX' decreases to equal to or less than either of VIN' and VOUT', and conversely, turns on series pass element 25 when the voltage at LX' increases to above both VIN' and VOUT'. The series pass element 25 turns on substantially simultaneously or synchronously with switch S1' being turned off. During continuous conduction, wherein the switch S1' turns on again before the current in inductor L1' declines to zero, pass element 25 turns off simultaneously with switch S1' turning on, and in discontinuous conduction wherein the current in inductor L1' drops to zero before the switch S1' turns on again, series pass element 25 turns off when the inductor current $I_L$ reaches zero.

The operation of the DC-DC converter of FIG. 2 is described below. The open and closed positions of switch S1' are controlled by switch control circuit 22. The details of the switch control circuit 22 depend on the choice of basic architecture of the DC-DC converter (Pulse Width Modulation, Pulse Frequency Modulation, etc.), details of which are not set forth herein, as such switch control circuits of various types are well known, and the specific type used or its detailed design does not impact the operation of the rectifier control circuit or the series pass element. Details of typical switch control circuits may be found in *Principles of Power Electronics,* by John G. Kassakian, Martin F. Schlecht and George C. Verghese (1991), Addison-Wesley Publishing Co., Inc., and *Modern DC-to-DC Switchmode Power Converter Circuits,* by Rudolf P. Severns and Gordon (Ed) Bloom (1985) Van Nostrand Reinhold Co. Inc.

When switch S1' is closed, current $I_L$ in inductor L1' starts to build up. Since the voltage at LX' (VLX'≈0V) is below the voltage of VIN', series pass element 25 is off. When switch S1' is opened, the voltage at LX' will immediately and rapidly rise because of the back EMF of the inductor. Rectifier control circuit 26 senses the rise in voltage at LX' and turns on series pass element 25 when the voltage at LX' increases beyond both VIN' and VOUT'. In the case where VIN' is less than VOUT' (step-up operation), series pass element 25 turns on when the voltage at LX' goes above VOUT' by approximately the on voltage across the pass element. The rectifier control circuit 26 controls the on voltage drop across the series pass element to minimize the power dissipation therein. In the preferred embodiment, the on voltage drop is approximately 200 mV. In the case where VIN' is greater than VOUT' (step-down operation), series pass element 25 turns on when the voltage at LX' is above VIN' by approximately a Schottky diode voltage drop. When switch S1' turns off and series pass element 25 turns on, current $I_L$ in inductor L1' starts decreasing because VLX' is above VIN'. In continuous conduction, series pass element 25 turns off when switch S1' is again closed (VLX'≈0V), and in discontinuous conduction, series pass element 25 turns off when the inductor current $I_L$ drops to zero (VLX'=VIN'). If the output voltage VOUT' is at its targeted value, switch control circuit 22 will keep S1' open, for instance in pulse width modulation because of zero pulse width, and in pulse frequency modulation because of the zero or then very low frequency of the switch operation. Without S1' being closed, there is no energy built-up in inductor L1' and thus VLX'=VIN', and the series pass element 25 stays off regardless of whether VIN' is above or below the targeted output voltage, thus allowing the output voltage VOUT' to stay in regulation.

When the output voltage VOUT' starts to drop below its target value, switch S1' will turn on and off with a duty cycle or frequency appropriate to drive the output voltage toward the target value based on the feedback of a voltage proportional to the output voltage from resistor divider R1' and R2'. For continuous conduction (substantial output loads), the inductor current waveform will be as follows. The pass element 25 will be off when switch S1' is on, during which time VLX' will be substantially zero and the inductor current will substantially linearly increase from a low value to a high value, and the pass element 25 will be on when switch S1' is off, during which time VLX' will be slightly higher than VIN' or VOUT', whichever is higher, and the inductor current will substantially linearly decrease from the high value to the low value, at which time the switch S1' will again turn on, whereupon the cycle repeats.

For discontinuous conduction, typical waveforms of the voltage at node LX' and inductor current $I_L$ are shown in FIGS. 3A, 3B, 3C and 3D. FIG. 3A shows the voltage waveform at node LX' when VIN' is less than VOUT' (step-up operation), and FIG. 3B shows the corresponding inductor current $I_L$. Regions 30 and 31 indicate that the voltage of node LX' slightly exceeds the output voltage VOUT' during the time periods when series pass element 25 is on. After the closing of switch S1' at the beginning of time periods T0 or T3, allowing energy to build in inductor L1', followed by the opening of switch S1' at the end of time period T0 or T3, series pass element 25 turns on. Hence, during period T0 and T3, when S1' is closed, pass element 25 is off. During time periods T1 and T4, the pass element 25 is on, turning off again when the current in the inductor goes to zero at the end of time periods T1 and T4 and remaining off until switch S1' is closed and then opened again. The average current delivered to the output during each cycle of operation is the integral with respect to time of the current waveform of FIG. 3B during T1 divided by the cycle period T0+T1+T2, the current during the increasing current part of the waveform going to ground to build the energy in the inductor for later transfer to the output.

FIG. 3C shows the voltage waveform at node LX' when VIN' is greater than VOUT' (step-down operation) for discontinuous conduction. In time period T0', switch S1' is on and series pass element 25 is off. When switch S1' turns off at the end of time period T0', series pass element 25 turns on as the voltage at LX' exceeds the voltage VIN', as indicated by region 32. When the current in the inductor goes to zero at the end of time period T1', the back EMF of the inductor will fall substantially to zero and the series pass element will turn off and remain off during time period T2' (A conventional rectifier, on the other hand, will turn on when the input voltage becomes greater than VOUT+VF and cause the output voltage to track the input voltage, as discussed earlier.). The cycle then repeats for time periods T3', T4' and T5', the pass element being on when the voltage at LX' exceeds the voltage VIN' at the beginning of time period T4', as indicated by region 33. FIG. 3D is the waveform of the corresponding inductor current $I_L$ during the periods of T0' through T5'.

With this control mechanism, series pass element 25 appears as a high impedance element when the DC-DC converter of the present invention is placed in the shut-down mode. In the shut-down mode (switch control circuit off), switch S1' is always open. Since there is no energy build-up in inductor L1', the voltage at LX' will not go above VIN', and series pass element 25 therefore will stay off.

A preferred embodiment of the synchronous rectifier of the present invention incorporates a PNP pass transistor as a series pass element. Rectifier control circuit 26 controls the base drive to the PNP pass transistor so that the PNP transistor can operate in multiple modes, as discussed below:

1) In a step-up operation (or VIN'<VOUT'), when VLX'>VOUT', series pass element 25 is ON, and the PNP transistor is driven to the edge of saturation to maintain a low VCE (collector to emitter voltage) across the PNP transistor while minimizing the base drive;

2) In a step-down operation (or VIN'>VOUT'), when VLX'>{VIN'+ a forward-biased voltage of a diode}, series pass element 25 is ON, and the base drive to the PNP transistor is controlled such that it is in the forward active region. As in a linear regulator, the voltage drop across the series pass PNP transistor varies with the changes or fluctuations in the unregulated input voltage;

3) When VLX'>VOUT' and VIN'≈VOUT', series pass element 25 is ON, and the PNP transistor is in transition between modes 1 and 2; and 4) When VLX≦VOUT' or VLX'≦VIN', the PNP transistor forming series pass element 25 is OFF.

VIN'<VOUT' (STEP-UP OPERATION)

In order to maintain a low VCE across a transistor, which minimizes power dissipation in the transistor and improves the efficiency of the circuit, the transistor has to be driven beyond its forward active mode and close to the edge of saturation. Excessive base drive will push the transistor deeper into saturation without yielding a significant reduction in the VCE. Driving the transistor deeper into saturation not only is wasteful in power dissipation, but also increases the time required to turn off the transistor due to the stored base charge. The base drive needs to be precisely controlled to achieve minimal power loss in series pass element 25 without incurring the disadvantages of deep saturation. At an ideal near saturation operating point, any increase in base current will increase power consumption in the base circuit without an offsetting power reduction from the current flow across the emitter to collector voltage drop, whereas any decrease in base current will increase power consumption from the current flow across the emitter to collector voltage drop without an offsetting power reduction in the base circuit drive.

Figure 4:
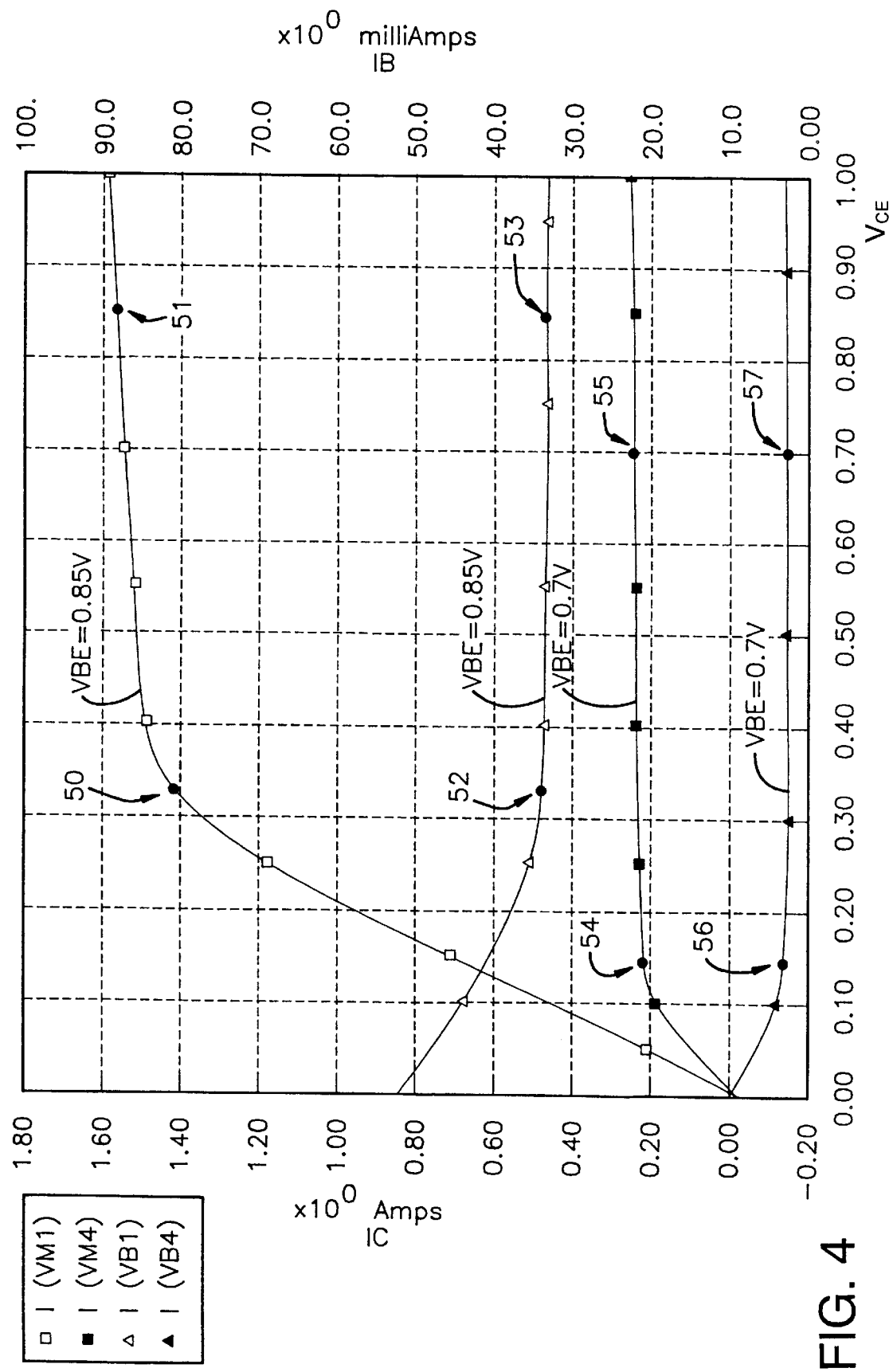
FIG. 4 shows the current-voltage characteristics of a pass element employed in the present invention.

A typical IC-VCE characteristic curve of a power PNP transistor is shown in FIG. 4. In this Figure, four specific curves are shown, two showing collector current IC for two values of base to emitter voltages (the curves with open and solid square points for base to emitter voltages of 0.85 and 0.7 volts respectively) and two showing corresponding base currents IB (the curves with the open and solid triangular points, respectively), all plotted against the collector to emitter voltage VCE.

The power delivered and lost in the PNP pass transistor providing the output voltage VOUT is approximately given by:

$$P(delivered) \approx IC*VOUT$$

$$P(loss) \approx IC*VCE+(VLX-VBE)*IB$$

where
IC=the current in the collector of the pass transistor
VCE=the collector-emitter voltage of the pass transistor
VLX=the voltage on the emitter of the pass transistor
VBE=the base-emitter voltage of the pass transistor
IB=the base current in the pass transistor In order to maximize the efficiency of the converter, the ratio of P(delivered) to P(loss) has to be maximized. Excessive base drive reduces the VCE of the device, but a major portion of the emitter current is lost as base current which reduces the above-mentioned ratio. Not driving the transistor with enough base drive increases the VCE of the device thus increasing the power lost. As can be seen in FIG. 4, the optimum region of operation of the PNP as a series pass element is near the knee of the IC-VCE curve (that is, near points 50 and 52 and 54 and 56 in FIG. 4) where the device is at the edge of saturation. In this region the VCE is at maintained at a low value without substantially increasing the base drive. The collector current of a device in this region is approximately 0.8 to 0.9 times the collector current of a device operating with VCB equal to 0V (points 51 and 53 and 55 and 57 in FIG. 4).

The circuit controlling the base drive to the rectifier ensures that the PNP pass transistor operates in the preferred region of operation. In the preferred embodiment, the base drive to the PNP pass transistor is controlled such that the collector current is about 0.9 times of the collector current value if the device were operating with VCB of 0V. This scheme ensures a low VCE drop across the transistor while at the same time keeping the base drive to a minimum. For the preferred embodiment, the VCE across the device is approximately 200 mV (which is less than the voltage drop across a 1 amp Schottky diode).

Figure 5:
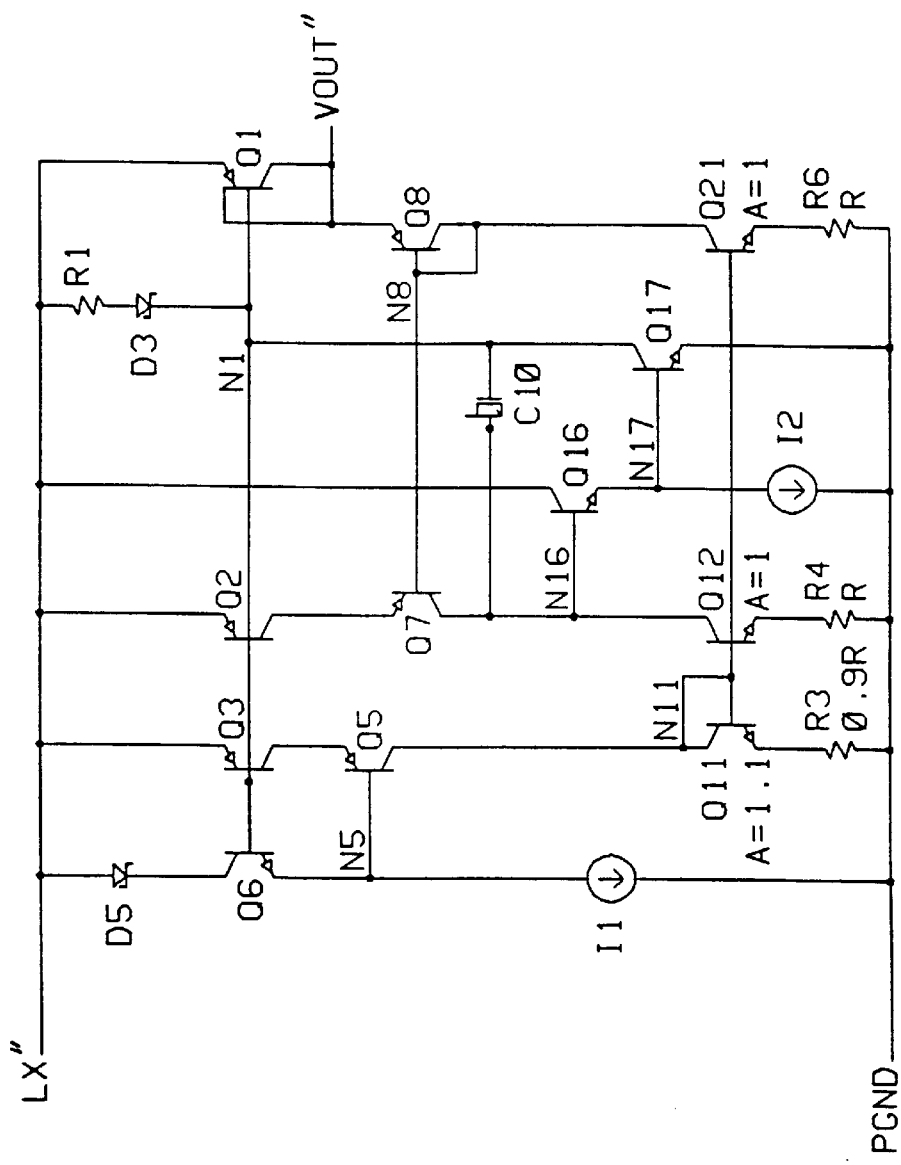
FIG. 5 is an efficient circuit for driving a PNP transistor to the edge of saturation.
Figure 6:
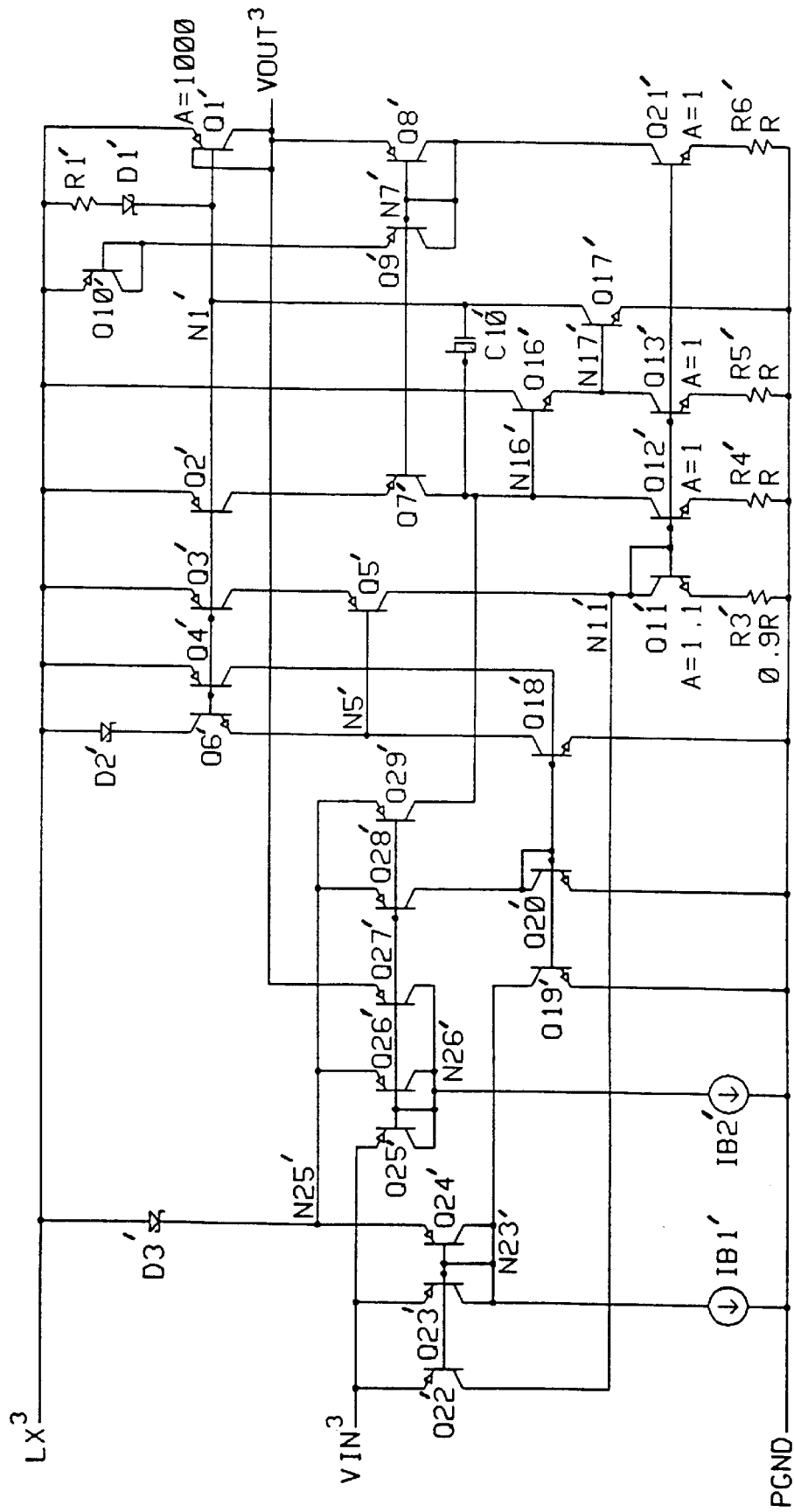
FIG. 6 is a circuit diagram for an embodiment for the synchronous rectifier and the rectifier control circuit of FIG. 2 according to the present invention.

A simplified schematic of a circuit which controllably drives the PNP pass transistor to the edge of saturation is shown in FIG. 5, where the voltage at LX", VLX", is greater than VOUT" (VLX">VOUT"). The circuit shown in FIG. 5 represents series pass element 25 and a portion of rectifier control circuit 26 of FIG. 2. A more detailed circuit diagram of rectifier control circuit 26 is shown in FIG. 6. FIG. 5 is presented here to show only the portion of rectifier control circuit 26 that participates in driving the PNP pass transistor to the edge of saturation during the step-up operation when VLX" is greater than VOUT".

In FIG. 5, Q1 is the PNP pass transistor. The emitter of Q1 is coupled to LX", the base of Q1 is coupled to node N1, and the collector of Q1 is coupled to VOUT". Q2 is a replica device, and Q3 is another device identical to the replica device. A closed loop circuit controls replica device Q2 (scaled 1/N of PNP pass transistor Q1) to operate at 90% of the collector current of Q3, operating with its base and emitter in parallel with replica device Q2 and its VCB controlled at approximately 0 V. Replica device Q2, therefore, operates at the edge of saturation. The control circuit also maintains a close relationship between the VCE of replica device Q2 and that of PNP pass transistor Q1. As a result, PNP pass transistor Q1 also operates at the edge of saturation.

Current source I1 provides a biasing current for the circuit, and current source I2 biases Q16. Resistor R1 and diode D1 together with Q17 bias node N1. The base of cascode transistor Q7 is biased at VOUT'' minus the VBE of Q8. The collector current of Q3 flows through Q11 and is mirrored by Q12 and Q21 at a ratio of 0.9. It should be noted that a notation such as A=1.1 or A=1 designates the relative size of a transistor. For example, the size of Q11 is 1.1 times that of Q12. Also, the relative resistor values are specified as 0.9 R or R. Thus, the value of resistor R3 is 0.9 times that of resistor R4 or R6. Obviously other ratios may be appropriate for other integrated circuit designs.

A Darlington driver (Q16 and Q17) drives the common bases of Q1, Q2 and Q3 through node N1 such that the collector current of Q2 is approximately 0.9 times the current in Q3. Thus, Q2 is driven to the edge of saturation as indicated by the IC-VCE characteristics shown in FIG. 4. For example, while Q3 operates at point 51, Q2 may operate at point 50 in FIG. 4. The cascode bias point for Q7 is derived from the collector of Q1. The base voltage of Q7 is equal to the collector voltage of Q1 minus the VBE of Q8. The VCE of Q1, therefore, tracks that of Q2. Since Q2 is driven to the edge of saturation, so is Q1 by the same amount. Frequency stability of the circuit is accomplished by a Miller capacitor C10.

It can be shown from the following equations that PNP pass transistor Q1 operates near the saturation region:

$$VLX''=VOUT''-VBE(Q8)+VBE(Q7)+VCE(Q2); \quad (1)$$

$$VBE(Q8) \approx VBE(Q7) \text{ (since } IC(Q12)=IC(Q21)); \quad (2)$$

$$VCE(Q1)=VLX''-VOUT''; \quad (3)$$

$$VCE(Q2)=VLX''-VOUT'' \text{ from equations (1) and (2);} \quad (4)$$

and $$VCE(Q1) \approx VCE(Q2) \text{ from equations (3) and (4).} \quad (5)$$

In sum, during a step-up operation (VOUT'>VIN'), when VLX''>VOUT'', since the VCE of PNP pass transistor Q1 is equal to the VCE of Q2 because of Q7 and Q8, Q1 like Q2 operates at the edge of saturation with a beta being approximately equal to 90% of that of Q3 operating at a zero VCB. Darlington driver (Q16 and Q17) and current mirror (Q11 and Q12) ensure that the collector current of Q2 is at 90% of that of Q3 to operate Q2 and Q1 at the edge of saturation. Thus, Q1 operates at the edge of saturation while maintaining a low VCE and minimizing the base current.

The key advantages of this technique are:

(a) a low VCE drop across the pass transistor;

(b) a minimal excess base drive independent of process variations, thus minimizing the power dissipation; and (c) a minimal excess stored base charge which enables fast turn-off of the pass transistor.

The circuit of FIG. 5 is a portion of the rectifier control circuit which drives the PNP pass transistor to the edge of saturation with minimal excess base drive. This circuit does not provide a means of turning off the PNP pass transistor.

FIG. 6 is a more detailed circuit diagram of the series pass element 25 and rectifier control circuit 26 of FIG. 2. A PNP pass transistor Q1' is used as the series pass element 25 of FIG. 2, and the rest of the circuit of FIG. 6 is the rectifier control circuit 26 of FIG. 2. VIN$^3$, LX$^3$ and VOUT$^3$ in FIG. 6 correspond to VIN', LX' and VOUT' respectively in FIG. 2. The circuit of FIG. 6 is an extension of the circuit of FIG. 5 and provides a means of turning off the PNP pass transistor. The devices in FIG. 6 having a primed numeral designation are the same as the unprimed numeral designation devices in FIG. 5 and have the same functions as described with respect thereto. The function of current source I2 is provided by resistor R5' and transistor Q13' of FIG. 6, and that of current source I1 is provided by Q18' and the base connections thereto. Transistors Q19' through Q31', bias current sources IB1' and IB2' and diode D3' enable the rectifier control circuit to turn off PNP pass transistor Q1'.

The ON/OFF state of the PNP pass transistor Q1' depends on the voltage at LX$^3$'VLX$^3$, relative to VIN$^3$ and VOUT$^3$. Series pass element Q1' is off when VLX$^3$ is less than or equal to VIN$^3$.

OFF STATE

In FIG. 6, when VLX$^3$ is less than or equal to VIN$^3$, the state of the circuit is as follows: The collector current of Q30' supplies current to diode connected transistor Q20', and the current is mirrored by Q18' and Q19'. With VLX$^3$ less than or equal to VIN$^3$, diode D3' ensures that Q24' is substantially off and the collector current of Q19' and bias current IB1' flow through Q23'. This current is mirrored by Q22' and flows into node N11'. The collector current of Q11' is therefore IC(Q3')+IC(Q22'). A current equal to 0.9 times this current is mirrored by Q12', and is the pull down current at node N16', the base of Darlington driver Q16' and Q17'. The size of Q30' is 0.35 times that of Q2' and Q3', which are identical. Therefore IC(Q3')=IC(Q2')=IC(Q30')/0.35=I.

Also, bias current IB2' either flows through Q25' if VIN$^3$ is higher than VOUT$^3$, or through Q27' if VOUT$^3$ is higher than VIN$^3$. In either case, bias current IB2' does not flow through Q26'. Since no current flows in Q26', there is no current in Q29'. The net pull down current at N16' is therefore (IC(Q3')+IC(Q30')+IB1')*0.9−IC(Q2') IC−(Q29')={I+0.35I+IB1'}*0.9−I−0=0.22I+0.9IB1'

The term 0.22I implies positive feedback, since an increase in the pull-up current of Q2' increases the pull down current. The positive feedback action ensures that the Darlington driver is off and there is no base drive to the PNP pass transistor Q1'.

Resistor R1' and diode D1' provide a pull up path to discharge node N1' when Q1' is off. When VLX$^3$ is less than VOUT$^3$, Q1' is in an inverted mode. Diode D1' blocks base current path through R1'. Similarly diode D2' blocks the base current path of Q1' through the base collector junction of Q6'. Thus there is no base current to enable Q1' from operating either in a forward or inverted mode.

Thus in summary, the base drive to the pass transistor Q1'is shut down and the pass transistor is OFF as long as VLX$^3$ is less than or equal to VIN$^3$, independent of VOUT$^3$.

OPERATION OF THE STEP-UP/STEP-DOWN CONVERTER WITH THE PREFERRED EMBODIMENT OF THE SYNCHRONOUS RECTIFIER

The operation of the step-up/step-down converter of FIG. 2 can now be described using the circuit of FIG. 6 as the series pass element 25 and rectifier control circuit 26.

STEP-UP MODE (VIN$^3$≦VOUT$^3$)

When S1' of FIG. 2 is closed, VLX$^3$ will be substantially zero. As was described earlier, the rectifier stays off since VLX$^3$ is less than VIN$^3$. The current in inductor L1' (I$_L$) increases linearly until S1' is opened. When S1' is opened, the stored energy in inductor L1' causes the voltage at LX' to rise.

When VLX$^3$ (or equivalently VLX') approaches VIN$^3$+VF' (VF' is the voltage across D3' in FIG. 6), Q24' starts to turn on and Q22' and Q23' start to turn off. The pull down current at node N16' therefore decreases. But since $VLX^3$ is less than $VOUT^3$, pass transistor Q1' and Q2' are still in reverse mode. There is no base drive to the Darlington driver (Q16' and Q17'). Also diodes D1 and D2 block reverse current flow into $VLX^3$. There is no base drive to Q1', Q2' and Q3' to enable their operation either in the forward or reverse modes, and they stay off.

The stored energy in the inductor L1' causes $VLX^3$ to continue to rise. When $VLX^3$ approaches $VOUT^3$, Q26' starts to turn on which is mirrored by Q29' and provides base drive to the Darlington driver (Q16' and Q17') to start to turn on pass transistor Q1'. $VLX^3$ continues to rise until the PNP pass transistor is driven to the edge of saturation.

Except for the additional drive from Q29' (approximately equal to IB2') to the Darlington stage, the devices in the left half of the circuit of FIG. 6 do not participate in this mode of operation and circuit portion 60 is in effect equivalent to the circuit shown in FIG. 5. As in the circuit of FIG. 5, the pass transistor Q1' is driven to the edge of saturation and $VLX^3$ is at $VOUT^3+VCE(Q1')$.

The voltage across L1' causes inductor current ($I_L$) to decrease linearly. If the converter were operating in discontinuous conduction, the inductor current reduces to zero, the voltage across the inductor also returns to zero (as show in FIG. 3A and FIG. 3B). Since $VLX^3$ is at $VIN^3$ the rectifier turns off (see previous description of the off state). The cycle repeats when S1' is closed.

If the converter were operating in a continuous conduction mode, the switch S1' turns on to start another cycle before the inductor current reaches zero, in which case the rectifier turns OFF since $VLX^3$ is substantially zero and thus less than $VIN^3$.

STEP-DOWN MODE ($VIN^3 \geq VOUT^3$)

Unlike a conventional diode rectifier, the synchronous rectifier circuit of FIG. 6 allows the operation of the DC-DC converter in a step down mode and maintains the output in regulation even when the input voltage is much higher than the target output voltage. When operating in a step-up mode, the PNP pass transistor is driven to the edge of saturation to minimize the power lost in the series pass element. While operating as a step-down converter, the PNP pass transistor is controlled to be in its forward active region to allow stored energy of the inductor to be transferred to the output. The voltage difference between $VIN^3$ and $VOUT^3$ appears across the PNP pass transistor as in a linear regulator. But unlike a linear regulator, energy is delivered to the output in a switched manner.

When S1' of FIG. 2 is closed, $VLX^3$ will be substantially zero and thus less than $VIN^3$. Q1' will be off as was described earlier. The inductor current IL increases linearly with time until S1' is opened. When S1' is opened, VLX' (equivalently $VLX^3$) starts to rise due to the stored energy in the inductor. Since $VIN^3$ is greater than $VOUT^3$, pass transistor Q1' stays OFF even when $VLX^3$ goes above $VOUT^3$ as long as $VLX^3$ is less than or equal to $VIN^3$ as was shown earlier. $VLX^3$ therefore continues to rise.

When $VLX^3$ approaches $VIN^3+VF'$ (VF' is the voltage across D3' in FIG. 6), Q24' starts to turn on and Q22' and Q23' start to turn off. The contribution of the pull down current in Q12' due to the collector current of Q22', therefore, starts decreasing. At the same time, Q26' also starts to turn on, and IC(Q26') is mirrored by Q29' to provide the base drive to the Darlington Driver (Q16' and Q17'). Node N7' starts to track $VLX^3$ such that V(N7') becomes $VLX^3=2VBE$ (due to Q9' and Q10'), causing Q2' to come out of saturation and to operate with a VCB approximately equal to 0V, since VCB(Q2')=VBE(Q7')-VBE(Q9'). Since IC(Q2') is approximately equal to IC(Q3'), IC(Q12') is approximately 0.9 times IC(Q3'), the difference between IC(Q7') and IC(Q12') is approximately 0.1 times IC(Q2'); that is, IC(Q7')-IC(Q12')=0.1*IC(Q2'). This difference drives the Darlington driver stage (Q16' and Q17') and starts to decrease $VLX^3$. Negative feedback control is accomplished through Q22'. With excessive base drive to the PNP pass transistor, $VLX^3$ decreases V(N25') and starts to turn on Q22' increasing the pull down current at node N16'. The closed loop control maintains $VLX^3$ at $VIN^3+VF'$.

The voltage across the inductor causes the inductor current (IL) to decrease linearly. If the converter were operating in discontinuous conduction, the inductor current reduces to zero, the voltage across the inductor also returns to zero (as shown in FIG. 3A and FIG. 3B). Since $VLX^3$ is at $VIN^3$ the rectifier turns off. The cycle repeats when S1' is closed.

If the converter were operating in a continuous conduction mode, the switch S1' turns on to start another cycle before the inductor current reaches zero, in which case the rectifier turns OFF since $VLX^3$ is substantially close to zero and therefore less than $VIN^3$. In the step-down mode, the voltage drop across the series pass PNP transistor varies with the changes or fluctuations in the unregulated input voltage $VIN^3$.

TRANSITION BETWEEN THE TWO MODES

When the voltages of $VIN^3$ and $VOUT^3$ are substantially the same, PNP pass transistor Q1' is in transition between the two modes described above. When pass transistor Q1' is being driven to the edge of saturation as in a step-up operation, the control loop can be modeled as a transconductance (IC/VA of Q2') feeding an integrator stage (Q16'-Q17'-C10'). When PNP pass transistor Q1' is controlled as part of a linear regulator as in a step-down operation, the transconductance is that of the differential pair (Q23'-Q24'). Node N16' is a summing junction from the two transconductances followed by the same integrator (Q16'-Q17'-C10'). Capacitor C10' is chosen to ensure frequency stability independent of which mode of operation is performed. The result of this summation determines the voltage at $LX^3$. The control transfers between the two modes, depending on which transconductance is higher in the region of operation.

SHUT DOWN MODE

When the DC-DC converter is to be placed in a shut down mode, the switch control circuit 22 holds S1' in the off state as in conventional topologies. Since S1' does not turn on, there is no energy build-up in L1', VLX' is substantially the same as VIN' and the PNP pass transistor turns off, presenting a high impedance from input to output thus enabling complete shutdown of the converter. This is unlike conventional architectures, where the catch diode presents a low impedance path from the input to output.

OTHER APPLICATIONS

While the preferred embodiment of present invention is directed toward step-up/step-down DC-DC converters, the use of a series pass element can easily be extended to other applications. For example, the series pass element can be used in a line driver output stage which is typically required to drive heavy capacitive loads. The frequency stability of the present invention is relatively insensitive to capacitive loading at the output. A voltage regulator is another example where some of the techniques of the present invention could be utilized.

While the present invention has been particularly described with reference to FIGS. 1 through 6, it should be understood that the figures are for illustration only and should not be taken as limiting the scope of the invention. Many changes and modifications may be made to the invention, by one having ordinary skill in the art, without departing from the spirit and scope of the invention as disclosed herein.

What is claimed is:

1. Apparatus for controllably coupling an input to an output having a fast response and a low forward conduction voltage drop comprising:

a bipolar pass transistor having its emitter and collector coupled in series between the input and the output;

a second bipolar transistor biased to operate with an approximately zero base to collector voltage;

circuitry for controlling the base of the bipolar pass transistor to controllably turn the bipolar pass transistor on and off, including circuitry for maintaining in the bipolar pass transistor, when turned on, a collector current density which is a predetermined percentage of the collector current density in the second bipolar transistor.

2. The apparatus of claim 1 wherein the circuitry for controlling the base of the bipolar pass transistor, when on, includes a third bipolar transistor, the third bipolar transistor being coupled to the second bipolar transistor so as to maintain a collector current density in the third bipolar transistor which is a predetermined percentage of the collector current density in the second bipolar transistor, the third bipolar transistor being coupled to the bipolar pass transistor so as to maintain the base to emitter voltage of the bipolar pass transistor approximately equal to the base to emitter voltage of the third bipolar transistor.

3. The apparatus of claim 1 wherein the circuitry for controlling the base of the bipolar pass transistor, when on, includes a third bipolar transistor, the third bipolar transistor being coupled to the second bipolar transistor so as to maintain a collector current density in the third bipolar transistor which is a predetermined percentage of the collector current density in the second bipolar transistor, the second and third bipolar transistor being coupled to the bipolar pass transistor so as to maintain the base to emitter voltage of the bipolar pass transistor approximately equal to the base to emitter voltage of the second and third bipolar transistors.

4. Apparatus for maintaining a first transistor coupled between an input and an output, when turned on, in near saturation so as to have a fast response and a low forward conduction voltage drop, comprising:

first, second, third and fifth transistors of a first conductivity type, and a fourth transistor of a second conductivity type, each having an emitter, a base and a collector;

the first, second, third and fourth transistors having their bases connected together;

the first, second and third transistors having their emitters connected to the input;

the fourth transistor having its collector connected through a PN junction diode to the input;

the fifth transistor having its base connected to the emitter of the fourth transistor and its emitter connected to the collector of the third transistor;

biasing circuitry for biasing the third, fourth and fifth transistors on, and the base emitter voltages of the fourth and the fifth transistors holding the collector to base voltage of the third transistor to approximately zero, the current through the third and fifth transistors being mirrored to a summing point coupled to the collector of the second transistor and substantially equal thereto when the second transistor has a collector current density which is approximately equal to a predetermined percentage of a collector current density in the third transistor; and circuitry for controlling the voltage of the bases of the first, second, third and fourth transistors responsive to the voltage of the summing point.

5. The apparatus of claim 4 further comprising circuitry for maintaining the voltages of the collectors of the first and second transistors approximately equal.

6. The apparatus of claim 4 further comprising capacitive coupling between the bases of the first, second, third and fourth transistors and the summing point for frequency stability.

7. The apparatus of any one of claims 4 through 6 wherein the first, second and third transistors are PNP transistors.

8. Apparatus for controllably turning a bipolar transistor coupled between an input and an output on and off, and when turned on, maintaining the bipolar transistor in near saturation so as to have a fast response and a low forward conduction voltage drop, comprising:

first, second, third and fifth bipolar transistors of a first conductivity type, and a fourth bipolar transistor of a second conductivity type, each having an emitter, a base and a collector;

the first, second, third and fourth transistors having their bases connected together;

the first, second and third transistors having their emitters connected to the input;

the fourth transistor having its collector connected through a PN junction diode to the input;

the fifth transistor having its base connected to the emitter of the fourth transistor and its emitter connected to the collector of the third transistor;

biasing circuitry for controllably biasing the third, fourth and fifth transistors on, and when on;

the base to emitter voltages of the fourth and the fifth transistors holding the collector to base voltage of the third transistor to approximately zero, the current through the third and fifth transistors being mirrored to a summing point coupled to the collector of the second transistor and substantially equal thereto when the second transistor has a collector current density which is approximately equal to a predetermined percentage of a collector current density in the third transistor;

circuitry for controlling the voltage of the bases of the first, second, third and fourth transistors responsive to the voltage of the summing point; and circuitry responsive to the relative values of first and second voltages for providing an additional current component at the summing point.

9. The apparatus of claim 8 further comprising circuitry for maintaining the voltages of the collectors of the first and second transistors approximately equal.

10. The apparatus of claim 8 further comprising capacitive coupling between the bases of the first, second, third and fourth transistors and the summing point for frequency stability.

11. The apparatus of any one of claims 8 through 10 wherein the first, second and third transistors are PNP transistors.

12. A circuit for controllably coupling an input to an output, the circuit comprising:

a pass transistor having an emitter, a collector and a base, the emitter being coupled to the input, the collector being coupled to the output;

a second transistor coupled to the pass transistor, the second transistor being biased to operate with a collector-to-base voltage approximately equal to zero; and a control circuit coupled to the input, to the output and to the base of the pass transistor, the control circuit controllably turning the pass transistor on, the control circuit maintaining in the pass transistor, when the pass transistor is turned on, a first collector current approximately equal to a predetermined scale factor times a second collector current of the second transistor, the predetermined scale factor ensuring that the pass transistor operates at the edge of a saturation region when the pass transistor is turned on.

13. The circuit of claim 12 wherein the second transistor and the pass transistor have a same current density.

14. The circuit of claim 13 wherein the predetermined scale factor is 0.9N, where N is a strictly positive integer.

15. The circuit of claim 12 wherein the control circuit comprises:

a third transistor coupled to the pass transistor, the third transistor operating at the edge of a saturation region when the pass transistor is turned on, collector-to-emitter voltages of the third transistor and of the pass transistor being approximately equal.

16. The circuit of claim 15 wherein the second and the third transistors are coupled to the pass transistor such that base-to-emitter voltages of the pass transistor and of the second and third transistors are approximately equal.

17. The circuit of claim 15 wherein the third transistor is identical to the second transistor.

18. The circuit of claim 15 wherein a third collector current of the third transistor is approximately equal to ninety percent of the second collector current of the second transistor when the pass transistor is turned on.

19. The circuit of claim 12 wherein the pass transistor is a PNP transistor.

* * * * *